United States Patent [19]

Zank

[11] Patent Number: 5,516,867

[45] Date of Patent: May 14, 1996

[54] MODIFIED HYDROGEN SILSESQUIOXANE RESIN

[75] Inventor: Gregg A. Zank, Midland, Mich.

[73] Assignee: Dow Corning Corporation, Midland, Mich.

[21] Appl. No.: 439,843

[22] Filed: May 12, 1995

[51] Int. Cl.$^6$ .................................................. C08G 77/08
[52] U.S. Cl. ............................ 528/12; 525/477; 525/478; 528/21; 528/23; 528/31
[58] Field of Search .................................. 528/31, 21, 23, 528/12; 525/477, 478

[56] References Cited

U.S. PATENT DOCUMENTS

| | | |
|---|---|---|
| 3,615,272 | 10/1971 | Collins et al. |
| 4,388,449 | 1/1983 | Bonnet et al. ............................ 525/478 |
| 5,010,159 | 4/1991 | Bank et al. |
| 5,210,168 | 5/1993 | Bergstrom et al. ........................ 528/16 |
| 5,387,480 | 2/1995 | Haluska et al. ............................ 528/15 |

FOREIGN PATENT DOCUMENTS 60-86017  5/1985  Japan.

*Primary Examiner*—Melvyn I. Marquis
*Attorney, Agent, or Firm*—Roger E. Gobrogge

[57] ABSTRACT

Disclosed is a novel resin of the structure $(HSiO_{1.5})_x(R_1R_2R_3SiO_{0.5})_y$, wherein $R_1$, $R_2$, and $R_3$ are independently selected from hydrogen, alkyls and aryls, x is 0.25 to 0.99, y is 0.01 to 0.75 and x+y=1.0. Also disclosed is a method for making these resins.

12 Claims, No Drawings

MODIFIED HYDROGEN SILSESQUIOXANE RESIN

BACKGROUND OF THE INVENTION

The present invention relates to hydrogen silsesquioxane resin which has been modified to render it useful in the formation of ceramics.

Hydrogen silsesquioxane resin is known in the art. For instance, Collins et al. in U.S. Pat. No. 3,615,272 describe the production of soluble hydrogen silsesquioxane resin by the hydrolysis and condensation of a silane in a sulfuric acid medium. Similarly, Bank et al. in U.S. Pat. No. 5,010,159 teach an alternative method comprising hydrolyzing hydridosilanes in an arylsulfonic acid hydrate hydrolysis medium to form a resin which is then contacted with a neutralizing agent. These references, however, do not describe subsequent modification of the resin.

Nishi et al. in Japanese Kokai Patent No. 60-86017 teach polyhydrogen silsesquioxane resin obtained by bubbling water vapor through a solvent containing trichlorosilane. The silanol on the resultant resin was then silylated by adding dimethylchlorosilane. This reference, however, does not describe the process nor the product of the present invention.

The present inventor has unexpectedly found that hydrogen silsesquioxane resin can be modified to render it more useful in preparing ceramics.

SUMMARY OF THE INVENTION

The present invention relates to a method of making modified hydrogen silsesquioxane resin. The method comprises first refluxing a mixture of hydrogen silsesquioxane resin, an endcapping agent, an acid and water for a time sufficient to modify the resin. The hydrogen silsesquioxane resin is used at 1 part by weight and has the structure $HSi(OH)_x(X)_yO_{z/2}$, in which each X is a hydrolyzable substituent, $x=0-2$, $y=0-2$, $z=1-3$, $x+y+z=3$. The endcapping agent is used at between 0.1 and about 10 parts by weight and has the structure $(R_1R_2R_3Si)_2O$, wherein $R_1$, $R_2$, and $R_3$ are independently selected from hydrogen, alkyls, alkenyls and aryls. The acid is used at between 0.0001 and 0.05 parts by weight. The water is used at between 0.01 and 0.5 parts by weight. After the resin has been modified, the reaction mixture is cooled and the resin is recovered.

DETAILED DESCRIPTION OF THE INVENTION

The present invention is based on the discovery that hydrogen silsesquioxane resin can be modified by a redistribution reaction without causing gelation. This was particularly unexpected since the Si-H bonds of this resin are prone to cleavage in a variety of environments. The resultant novel resins have unique properties which render them valuable as ceramic precursors.

Hydrogen silsesquioxane resin (H-resin) is known in the art. Generally, it is formed by the hydrolysis or partial hydrolysis of $HSiX_3$, wherein X is a hydrolyzable substituent. Exemplary hydrolyzable substituents include halogens such as chlorine, fluorine, bromine and the like and hydrocarbonoxy groups such as alkoxy (eg., methoxy, ethoxy, propoxy), acyloxy, phenoxy and the like. The resultant resins have the formula $HSi(OH)_x(X)_yO_{z/2}$, in which each X is a hydrolyzable substituent as defined above, $x=0-2$, $y=0-2$, $z=1-3$, $x+y+z=3$. As such, these resins may be fully condensed $(HSiO_{3/2})_n$, wherein n is an integer of 8 or greater, generally between 8 and 5000 or they may be only partially hydrolyzed (i.e., containing some Si-X) and/or partially condensed (i.e., containing some Si-OH). Although not represented by this structure, these resins may contain a small number (eg., less than about 10%) of silicon atoms which have either 0 or 2 hydrogen atoms attached thereto due to various factors involved in their formation or handling.

Other resins, such as those described by Frye et al. in U.S. Pat. No. 4,999,397, hereby incorporated by reference, those described in Kokai Patent Nos. 59-178749, 60-86017 and 63-107122, or any other equivalent hydridosiloxane, will also function herein.

Methods for making hydrogen silsesquioxane resin are also known in the art. For example, it is known to hydrolyze an alkoxy or acyloxy silane with water in an acidic, alcoholic hydrolysis medium. Similarly, Collins et al. in U.S. Pat. No. 3,615,272, which is incorporated herein by reference, teach the production of a nearly fully condensed H-resin (which may contain up to 100–300 ppm silanol) by a process comprising hydrolyzing trichlorosilane in a benzenesulfonic acid hydrate hydrolysis medium and then washing the resultant resin with water or aqueous sulfuric acid. Additionally, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is then contacted with a neutralizing agent.

The hydrogen silsesquioxane resin is then modified according to this invention to render it useful in the formation of ceramic materials. Without modification, hydrogen silsesquioxane resin has a broad molecular weight range which can lead to a wide variability in the physical properties of the resin which, in turn, leads to variability in processing. Additionally, the broad molecular weight range of the resin can lead to decreased ceramic yields due to vaporization of low molecular weight species and to poor ceramics (eg., cracking).

The present inventor has discovered a novel method for tailoring the molecular weight distribution of the resin to eliminate these problems. This tailoring affords one the ability to make resins having, for instance, the appropriate rheological properties needed for ceramic fabrication. Similarly, the modification renders the resin curable under moderate conditions such as mild heat, radiation, curing catalysts or other curing agents. This curability is essential to increase the ceramic yield and to retain the shape of the resultant ceramics.

The molecular weight control is accomplished by a redistribution reaction under acid/water conditions in the presence of the endcapping agent in which Si-O bonds in the H-resin are exchanged for Si-O bonds in the endcapping agent. Typically, this reaction is performed by mixing a solution of the hydrogen silsesquioxane resin, the endcapping agent, the acid and the water. Typically, such mixing is performed under reflux conditions.

The solvents which may be used in this process to form the H-resin solution are not critical and nearly any which will not affect the reactants or the resultant resin can be used. Examples of such solvents include aromatic hydrocarbons such as benzene or toluene, alkanes such as n-heptane, octane, decane or dodecane, ketones such as methyl isobutyl ketone, esters, ethers and volatile polysiloxanes. Generally, the H-resin is diluted to between about 0.1 and about 50 weight % in these solvents.

The endcapping agent is generally a material which contains Si—C and Si—H bonds. Examples of such materials are those generally encompassed by the structure $(R_1R_2R_3Si)_2O$, wherein $R_1$, $R_2$, and $R_3$ are independently selected from hydrogen, alkyls such as methyl, ethyl, propyl and the like, alkenyls such as vinyl or aryls such as phenyl. Preferably, the alkyls, alkenyls and aryls have between 1 and 20 carbon atoms and more preferably between 1 and 6 carbon atoms. Specific compounds include tetramethyldisiloxane, hexamethytdisiloxane and the like.

The ratio of the H-resin to endcapping agent in this reaction is used to tailor the molecular weight of the resin. When larger amounts of endcapping agent are present, lower molecular weight products are produced whereas when smaller amounts are present higher molecular weight products are obtained. Generally, the molar ratio of H-resin to endcapping agent is in the range of about 10:1 to about 1:10.

The acids which may be used in this process are not critical and nearly any can be used. Generally, it is desirable that the acids are reasonably soluble in the solvent chosen. Examples of such acids include nitric, sulfuric, hydrochloric, trifluoroacetic, trifluoromethane sulfonic, para-toluene sulfonic and the like. Generally, these acids are used in an amount sufficient to cause the redistribution reaction. Obviously, the actual amount will vary depending on the strength of the acid selected. Generally, however, the amount of acid is between about 0.0001 and 0.05 parts by weight acid per part hydrogen silsesquioxane resin.

The amount of water used in the reaction is likewise that sufficient to cause the redistribution. Generally, this will be in the range of between about 0.001 to about 0.5 parts by weight water per part hydrogen silsesquioxane resin.

Generally, the redistribution reaction is performed by merely mixing the H-resin, solvent, endcapping agent, acid and water in a vessel and then refluxing the mixture until the redistribution reaction occurs. Generally, the mixture is refluxed for between about 1 and about 24 hours at a temperature in the range of 20° to 150° C. Preferably, the mixtures are refluxed at temperatures between 80° and 130° C.

After refluxing, the mixture is merely cooled and the product recovered (eg., by removal of the solvent by distillation). It may, however, be desirable to neutralize the reaction mixture. This can be accomplished by the addition of a base and/or washing with water. Suitable bases include, for instance, $CaCO_3$ and the like.

The expression "modified hydrogen silsesquioxane resin" is used to describe these endcapped resins which are curable and have tailored molecular weights. These resins generally have the structure $(HSiO_{1.5})_x(R_1R_2R_3SiO_{0.5})_y$, wherein $R_1$, $R_2$, and $R_3$ are independently selected from hydrogen, alkyls and aryls, x is 0.25 to 0.99, y is 0.01 to 0.75 and x+y=1.0. Preferably, $R_1$, $R_2$, and $R_3$ are independently selected from hydrogen and methyl, x is 0.5 to 0.99, y is 0.01 to 0.5 and x+y=1.0. Preferably, the Mn for these materials are in the range of about 500 to about 2500.

These materials can be crosslinked with curing catalysts such as platinum or peroxides. Alternatively, functional silicon-containing materials such as vinyl functional siloxanes may be used. They can also be converted to a ceramics by heating.

The following non-limiting examples are provided so that one skilled in the art might better understand the invention.

Throughout this specification "Me" represents a methyl group, "Ph" represents a phenyl group and "Vi" represents a vinyl group.

All reaction were carried out in an argon atmosphere in laboratory glassware. Hydrogen silsesquioxane resin was obtained from Dow Corning Corporation and was produced by the method of U.S. Pat. No. 3,615,272. $(Me_2HSi)_2O$ was purchased from Huls Systems. Trifluromethaneacetic acid was purchased from Aldrich Chemical.

All NMR spectra were recorded on a Varian VXR200T spectrometer. Solution spectra were recorded in $CDCl_3$ in a 5 mm switchable probe ($^1H$, 399.95 MHz) or a 16 mm Si-free probe ($^{29}Si$, 79.46 MHz) and referenced to internal $CDCl_3$ (7.25 ppm, $^1H$) or TMS (0 ppm). The integrals were normalized and calculated relative to the siloxane species. $Cr(acac)_3$ (0.02 M) was added for the $^{29}Si$ spectra to ensure quantitative acquisition.

Gel permeation chromatography (GPC) data were obtained on a Waters GPC equipped with a model 600E systems controller, a model 490 UV and model 410 Differential Defractometer detectors interfaced to a Digital Professional 380 computer employing Waters 'Expert' software; all values are relative to polystyrene standards.

Carbon, hydrogen and nitrogen analysis were done on a Control Equipment Corporation 240-XA Elemental Analyzer. Oxygen analyses were done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

All furnace firings were done in a Lindberg tube furnace, Model 54233 equipped with a Eurotherm controller.

EXAMPLE 1

Preparation of $(HSiO_{1.5})_{0.90}(Me_2HSiO_{0.5})_{0.10}$

A toluene solution (approximately 20% by weight solids) of hydrogen silsesquioxane resin, 265 g (53 g of hydrogen silsesquioxane resin), was placed in a 500 mL three necked round bottom flask fitted with an overhead stirrer, thermometer and condenser under argon. To this solution was added 67 g of $(Me_2HSiO)_2$ (one equivalent of $(Me_2HSiO)_{0.5}$, 1 g of trifluoroacetic acid and 1 g of water. The resulting solution was refluxed 24 h. The reaction was cooled and 1 g of $CaCO_3$ and 5 g of water were added to neutralize the acid. The reaction was fitted with a Dean Stark trap and the water was removed by azetroping dry over an 8 h period. The reaction was cooled and 5 g of $Me_2HSiCl$ added and allowed to stir overnight. The polymer was isolated by filtration through a 1.0 micrometer membrane and removing the solvent in vacuo at 50° C. The polymer was characterized by GPC molecular weight analysis: Mw=5,809; Mn=1,222 and z=4.75 and $^1H$ NMR which showed a broad singlet 4.8 ppm (1 H, $Me_2HSiO_{0.5}$), a broad multiplet at 4.4 ppm (9 H, $HSiO_{1.5}$) and a broad singlet at 0.3 ppm (6.2 H, $(Me)_2HSiO_{0.5}$).

EXAMPLE 2

Preparation of $(HSiO_{1.5})_{0.65}(Me_2HSiO_{0.5})_{0.35}$

A toluene solution (approximately 20% by weight solids) of hydrogen silsesquioxane resin, 650 g (130 g of hydrogen silsesquioxane resin), was placed in a 1 L three necked round bottom flask fitted with an overhead stirrer, thermometer and condenser under argon. To this solution was added 160 g of $(Me_2HSiO)_2$ (2.38 equivalents of $(Me_2HSiO)_{0.5}$, 2.5 g of trifluoroacetic acid and 2.5 g of water. The resulting solution was refluxed 48 h. The reaction was cooled and 2.5 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 222 g. The polymer was characterized by GPC molecular weight analysis: Mw=4,269; Mn=1,407 and z=3.03 and $^1$H NMR which showed a broad singlet 4.7 ppm (3.5 H, $Me_2HSiO_{0.5}$), a broad multiplet at 4.4 ppm (6.5 H, $HSiO_{1.5}$) and a broad singlet at 0.2 ppm (12.5 H, $(Me)_2HSiO_{0.5}$) and $^{29}$Si NMR which showed a broad doublet at −4.0 ppm (1 Si, $(Me)_2HSiO_{0.5}$ and a broad doublet at −85 ppm (1.68 Si, $HSiO_{1.5}$.

EXAMPLE 3

Preparation of $(HSiO_{1.5})_{0.92}(Me_2HSiO_{0.5})_{0.08}$

A toluene solution (approximately 40% by weight solids) of hydrogen silsesquioxane resin (Mw=9,667; Mn=1200; z=8.05), 358 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29,010; Mn=1,653 and z=17.74 and $^{29}$Si NMR which showed a broad doublet at −3.0 ppm (1 Si, $(Me)_2HSiO_{0.5}$ and a broad doublet at −85 ppm (11.12 Si, $HSiO_{1.5}$).

As a test of the stability of this polymer the GPC molecular weight was measured twice a week for 3 weeks after which time it was apparent that the molecular weight of the polymer was drifting upwards and the polymer was becoming less soluble and leading to gelation.

EXAMPLE 4

Preparation of $(HSiO_{1.5})_{0.92}(Me_2HSiO_{0.5})_{0.08}$

A toluene solution (approximately 18% by weight solids) of hydrogen silsesquioxane resin (Mw=9,667; Mn=1200; z=8.05), 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 179 g. The polymer has a Tg of −39° C. and was characterized by GPC molecular weight analysis: Mw=9,194; Mn=1,338 and z=6.87 and $^{29}$Si NMR which showed a broad doublet at −3.0 ppm (1 Si, $(Me)_2HSiO_{0.5}$ and a broad doublet at −85 ppm (12.175 Si, $HSiO_{1.5}$).

As a test of the stability of this polymer the GPC molecular weight was measured twice a week for 6 weeks after which time it was apparent that the molecular weight of the polymer was not changing at all, indicating that the material was not gelling.

EXAMPLE 5

Preparation of $(HSiO_{1.5})_{0.92}(Me_2HSiO_{0.5})_{0.08}$

A toluene solution (approximately 18% by weight solids) of hydrogen silsesquioxane resin 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29,010 and Mn=1,635 and $^{29}$Si NMR which showed a broad doublet at −3.0 ppm (1 Si, $(Me)_2HSiO_{0.5}$ and a broad doublet at −85 ppm (12.175 Si, $HSiO_{1.5}$).

EXAMPLE 6

Preparation of $(HSiO_{1.5})_{0.63}(Me_2HSiO_{0.5})_{0.37}$

A toluene solution (approximately 18% by weight solids) of hydrogen silsesquioxane resin 650 g (117 g of hydrogen silsesquioxane resin), was placed in a 1 L three necked round bottom flask fitted with an overhead stirrer, thermometer and condenser under argon. To this solution was added 160 g of $(Me_2HSiO)_2$ (2.4 equivalents of $(Me_2HSiO)_{0.5}$, 2.0 g of trifluoroacetic acid and 2.0 g of water. The resulting solution was refluxed 48 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 70 g. The polymer has a Tg of −22° C. and was characterized by GPC molecular weight analysis: Mw=4,269 and Mn=1,407 and $^{29}$Si NMR which showed a broad doublet at −4.0 ppm ($(Me)_2HSiO_{0.5}$) and a broad doublet at −85 ppm ($HSiO_{1.5}$).

That which is claimed is:

1. A method for modifying hydrogen silsesquioxane resin comprising:

refluxing a mixture comprising 1 part by weight hydrogen silsesquioxane resin of the structure $HSi(OH)_x(X)_yO_{z/2}$, in which each X is a hydrolyzable substituent, x=0–2, y=0–2, z=1–3, x+y+z=3, between 0.1 and 10 parts by weight of an endcapping agent of the structure $(R_1R_2R_3Si)_2O$, wherein $R_1$, $R_2$, and $R_3$ are independently selected from hydrogen, alkyls, alkenyls or aryls, between 0.0001 and 0.05 parts by weight of an acid and between 0.01 and 0.5 parts by weight water, for a time sufficient to modify the hydrogen silsesquioxane resin;

cooling the reaction mixture; and recovering the resin.

2. The method of claim 1 wherein X is selected from the group consisting of Cl and alkoxy.

3. The method of claim 1 wherein $R_1$, $R_2$, and $R_3$ are independently selected from the group consisting of hydrogen and methyl.

4. The method of claim 1 wherein the endcapping agent is selected from the group consisting of tetramethyldisiloxane and hexamethyldisiloxane.

5. The method of claim 1 wherein the hydrogen silsesquioxane resin is diluted in a solvent selected from the group consisting of aromatic hydrocarbons, alkanes, ketones, esters, ethers and volatile polysiloxanes at a concentration in the range of between 0.1 and 50 weight %.

6. The method of claim 1 wherein the acid is trifluoroacetic acid.

7. The method of claim 1 wherein the mixture is refluxed for between 1 and 24 hours.

8. The method of claim 1 wherein the mixture is refluxed at a temperature between 20° and 150° C.

9. Modified hydrogen silsesquioxane resin of the structure $(HSiO_{1.5})_x(R_1R_2R_3SiO_{0.5})_y$, wherein $R_1$, $R_2$, and $R_3$ are independently selected from hydrogen, alkyls or aryls, x is 0.25 to 0.99, y is 0.01 to 0.75 and x+y=1.0.

10. The modified hydrogen silsesquioxane resin of claim 9 wherein $R_1$, $R_2$, and $R_3$ are independently selected from hydrogen or methyl, x is 0.5 to 0.99, y is 0.01 to 0.5 and x+y=1.0.

11. The modified hydrogen silsesquioxane resin of claim 9 having the structure $(HSiO_{1.5})_x(Me_2HSiO_{0.5})_y$, wherein x is 0.5 to 0.99, y is 0.01 to 0.5 and x+y=1.0.

12. The modified hydrogen silsesquioxane resin of claim 9 having an Mn in the range of between about 500 and about 2500.

\* \* \* \* \*